Sept. 13, 1949.  C. O. MARSHALL, JR  2,482,013
SLICING MACHINE
Filed Feb. 16, 1946  3 Sheets-Sheet 1
Fig. I
Fig. II
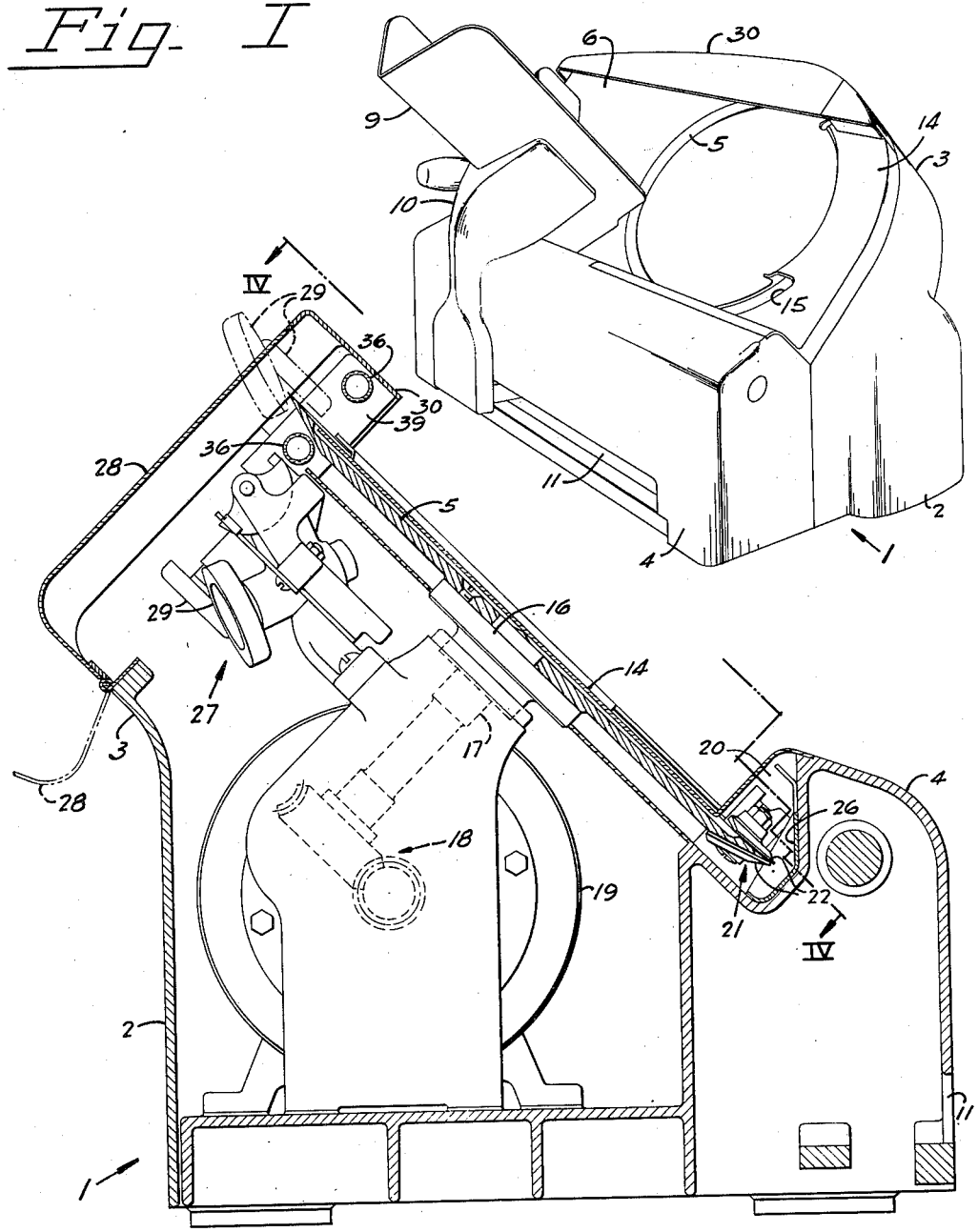
INVENTOR.
Charles O. Marshall Jr.
BY
Marshall and Marshall
ATTORNEYS Sept. 13, 1949.
C. O. MARSHALL, JR
2,482,013
SLICING MACHINE
Filed Feb. 16, 1946
3 Sheets-Sheet 2
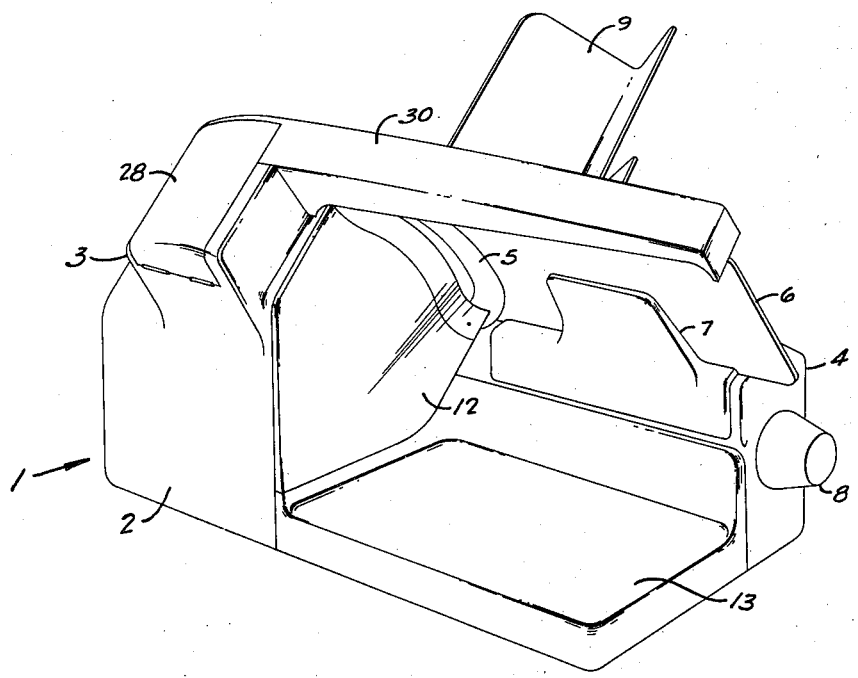
Fig. III
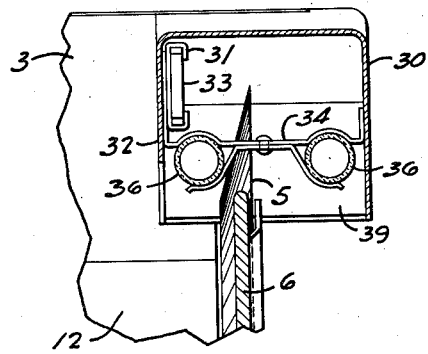
Fig. V
INVENTOR.
Charles O. Marshall Jr.
BY
Marshall and Marshall
ATTORNEYS

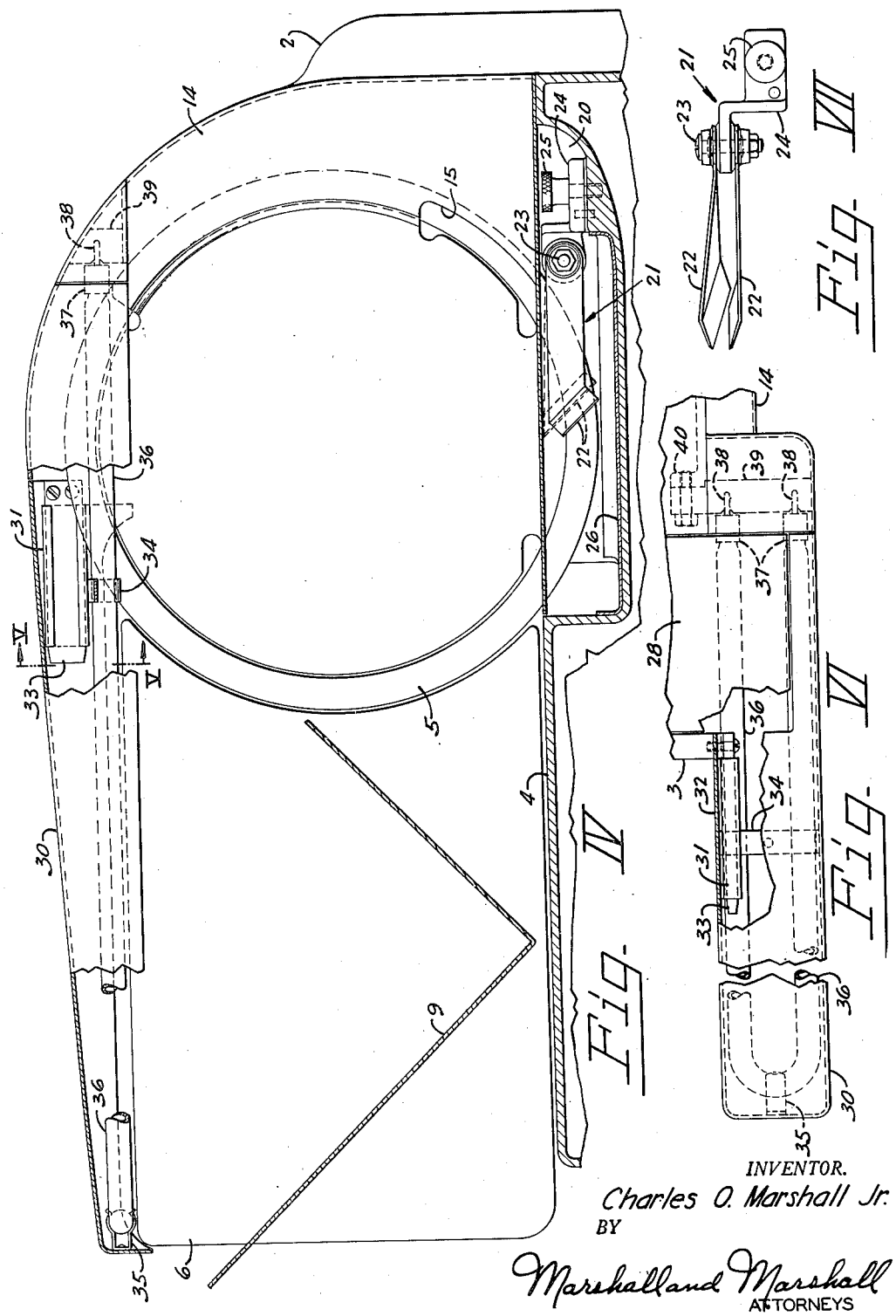

Patented Sept. 13, 1949

2,482,013

UNITED STATES PATENT OFFICE 2,482,013

SLICING MACHINE

Charles O. Marshall, Jr., Toledo, Ohio, assignor to Toledo Scale Company, Toledo, Ohio, a corporation of New Jersey Application February 16, 1946, Serial No. 648,106

3 Claims. (Cl. 146—102)

This invention relates to slicing machines, particularly machines for slicing commodities which employ high-speed rotary knives and to means for sterilizing all portions of the machine which come into actual physical contact with the commodity being sliced.

The bactericidal effects of ultra-violet rays of certain wave-lengths have been found to be very effective in the destruction and inhibition of the growth of various types of air-borne bacteria and mold spores. Devices have been developed for attachment to food slicing machines which expose the food contacting portions of the machine to the bactericidal effect of the ultra-violet ray emitting lamp, but for the most part these devices have been less effective because either they did not expose all of the food contacting parts of the machine to the rays or the attachments themselves were clumsy or bulky or protruded from the body of the machine to which they were attached and constituted dirt catching obstructions.

It is an object of this invention to provide a simple, easily detached bactericidal device for a food slicing machine which exposes all food contacting portions of the machine to the effects of the ray emitting lamps.

It is another object of this invention to provide a bactericidal attachment for a food slicing machine which employs only a single ray emitting lamp and yet is effective on all food contacting portions of the machine.

These objects and others more specific are accomplished through the use of a substantially U-shaped ultra-violet ray emitting lamp so positioned as to expose all food contacting surfaces of the slicing machine to the bactericidal rays emitted thereby and by the design of a housing for such tube which is quickly and easily detachable for replacement and which constitutes an integral portion of the slicing machine construction.

In the drawings:

Figure I is a perspective view of a slicing machine embodying the invention showing the front and one side of the machine.

Figure II is a vertical sectional view taken substantially on the center line of the rotary knife of the slicing machine and shown on an enlarged scale.

Figure III is a perspective view of the slicing machine shown in Figure I, but showing the side and end opposite to those shown in Figure I.

Figure IV is a fragmentary view, taken substantially on the line IV—IV of Figure II.

Figure V is a fragmentary vertical sectional view taken substantially on the line V—V of Figure IV.

Figure VI is a fragmentary plan view of a portion of the slicing machine embodying the invention and showing in detail the bactericidal attachment.

Figure VII is a detailed view of a knife scraper employed in the slicing machine illustrated.

The food slicing machine illustrated in the drawings has a main housing 1 which comprises several portions. These include a drive housing 2, a sharpener housing 3 and a slide housing 4. A rotary high-speed knife 5 is mounted with its face on an inclined plane and is driven by a motor and gearing located within the housing 2. A thickness gauge plate 6 is secured on a bracket 7 with its face lying in a plane parallel to the plane of the face and cutting edge of the knife 5. By means of mechanism controlled by a hand knob 8, the gauge plate 6 can be adjustably moved so that the plane of its face remains parallel but is at varying distances from the plane of the cutting edge of the knife 5 to vary the thickness of the slices of commodity which are cut by the knife 5. The commodity to be sliced is carried on a commodity tray 9 which extends substantially at right angles from the planes of the gauge plate 6 and the knife 5 and is mounted in a bracket 10. The bracket 10 extends through a slot 11 into the interior of the slide housing 4 where it is mounted for free reciprocation longitudinally along the housing 4. The lowermost edge of the commodity tray 9 passes closely adjacent the plane of the edge of the knife 5 so that commodities being sliced are completely supported during the slicing operation.

A slice deflector 12 is mounted on the side of the drive housing 2 at the rear of the knife 5 so that slices severed from the commodity by the knife come into contact with the slice deflector and are "peeled away" to be received either in the operator's hand or to fall on a slice receiving tray 13 which is located behind and below the gauge plate 6 and the slice deflector 12.

Since only the forward edge of the knife 5 is used to sever slices of commodity the remaining portion of the knife is covered by a knife guard 14 which has a cutout section 15 at its lower portion to permit the edge of the commodity tray 9 to pass. The knife 5 is coaxial with a hub 16 mounted on a shaft 17 which is driven through gearing 18 by a motor 19 located within the drive housing 2. The knife guard 14 extends over a trough 20 formed in the upper portion of the slide housing 4 which contains a knife scraper 21 (see also Figures IV and VII). The scraper 21 consists of a pair of oppositely directed flexible blades 22. One end of each of the blades 22 is secured by a nut and bolt 23 to a bracket 24 which in turn is held in place within the trough 20 by a knurled thumb screw 25. A refuse tray 26 is located in the trough 20 beneath the scraper 21 to receive the meat portions and grease cleaned from the knife 5 by the blades 22. When the knife guard 14 is removed the thumb screw 25 is exposed and the scraper 21 can be taken out of the trough 20 for cleaning. At this time the refuse tray 26 also can be removed for disposal of the refuse.

A sharpening device 27 is mounted within the sharpener housing 3 above the motor 19. The sharpener housing 3 has a hinged cover 28 which when opened is swung back and down as shown by the broken lines in Figure II to permit the sharpening device 27 to be swung upwardly and forwardly with its sharpening wheels 29 in the operative position shown by the broken lines in Figure II.

The commodities being sliced on the machine come into contact with the following portions of the machine: The commodity tray 9, the gauge plate 6, the knife 5, the knife guard 14, the slice deflector 12 and the slice receiving tray 13. Thus, it is necessary that each of these parts be exposed to the bactericidal rays. This is accomplished by the construction described below. A lamp canopy 30 is removably mounted so that its open bottom extends along and above the edge of the gauge plate 6. The canopy 30 has a clip 31 (see Figure V) which is C-shaped in cross section spot welded or otherwise attached to the inner side of its rear wall 32. The clamp 31 tightly fits a bar 33 which is secured to the wall of the sharpener housing 3 (see Figure VI). The canopy 30 has a two-arm supporting clip 34 welded to the inner surface of its two side walls about midway between its ends and a single supporting clip 35 secured to its end wall for the purpose of supporting the two arms and end of a U-shaped ultra-violet ray emitting lamp 36. At the ends of each of the arms of the lamp 36 there is located a base 37. Each of the bases 37 has a prong type connector 38 which is engageable in one of two holes in a socket 39 secured to a lug 40 on the inner wall of the sharpener housing 3. The socket holes in the socket 39 are spaced the same as the prongs 38 on the arms of the lamp 36. The surfaces of the canopy 30 (see particularly Figures I, III and IV) are flush with and continue the exterior conformation of the sharpener housing 3 and the sharpener cover 28 and fit closely adjacent thereto. The wall of the canopy 30 which lies over the commodity side of the gauge plate 6 and knife 5 and also, therefore, over the end of the commodity tray 9, extends farther along above the gauge plate 6 than the opposite wall and thus it provides a protection for the full length of the corresponding arm of the lamp 36.

Because of the construction of the clip 31 and the bar 33 and of the bases 37 and the socket 39, the entire unit composing the canopy 30 and the lamp 36 can be removed from the slicing machine as a whole simply by sliding it longitudinally away from the sharpener housing 3. This enables the lamp 36 to be replaced easily and quickly.

The particular type of ultra-violet ray emitting lamp which is employed does not constitute a part of the instant invention, but it has been found that the "Sterilamp" manufactured by the Westinghouse Electric & Manufacturing Co. is very efficient in its bactericidal effect and it is recommended that lamps of this or similar type be employed.

Because of the employment of the canopy 30 extending as it does over the upper edge of the gauge plate 6, the lamp 36 is positioned so that its rays fall on all of the commodity contacting members of the slicing machine. As can be seen in Figures II and V particularly, the two arms of the lamp 36 extend closely adjacent both sides of the upper portion of the knife 5 and thus when the knife rotates its entire edge is exposed to concentrated bactericidal rays. The scraper 21 is designed to remove the majority of the meat particles and grease which are picked up by the knife before the knife is exposed to the ultra-violet rays and, thus an insufficient amount of refuse is left on the knife to interfere with the efficient operation of the bactericidal rays. It is particularly important that the knife blade be most effectively treated by the rays because if bacteria or mold spores exist on its surface they are spread over the entire surface of each slice of commodity being sliced. Similarly, of course, the exposure of other commodity contacting portions of the machine to the ultra-violet rays prevents the contamination of such portions by air-borne bacteria and spores and also prevents the growth of other bacteria and spores which may be deposited on such surfaces from commodity wrappings or paper used to receive and wrap slices on the slice receiving tray 13.

The embodiment of the invention which has been disclosed may be modified to meet various requirements.

Having described my invention, I claim:

1. In a slicing machine having a rotary knife, a thickness gauge plate, a commodity tray reciprocable along said gauge plate and past said knife and slice deflecting and receiving members located at the side of said gauge plate opposite from said commodity tray, a bactericidal unit comprising a canopy slidably removable from said slicing machine, said canopy comprising a cover portion extending longitudinally over said gauge plate and a portion of said knife and laterally a short distance on each side of said gauge plate and containing a substantially U-shaped ultra-violet lamp.

2. In a slicing machine having a rotary knife, a thickness gauge plate, a commodity tray reciprocable along said gauge plate and past said knife and slice deflecting and receiving members located at the side of said gauge plate opposite from said commodity tray, a bactericidal unit comprising a canopy extending longitudinally over said gauge plate and laterally over the edges of said slice deflecting and receiving members and over the path of movement of said commodity tray, and a substantially U-shaped ultra-violet ray emitting lamp removably mounted in said canopy to cast its rays on both sides of a portion of the edge of said knife, on both sides of said gauge plate, on said slice deflecting and receiving members and on said commodity tray.

3. In a slicing machine having a rotary knife, a substantially planar thickness gauge plate, a commodity tray reciprocable along said gauge plate and past said knife and slice deflecting and receiving members located at the side of said gauge plate opposite from said commodity tray, a bactericidal unit comprising a canopy slidably removable from said slicing machine and a substantially U-shaped ultra-violet ray emitting lamp removably mounted in said canopy with the open end of the U embracing a portion of the edge of said knife blade, there being a single prong plug on the end of each of the arms of said lamp and a socket having a pair of cooperating holes for receiving said plugs mounted on a portion of said machine, whereby sliding said canopy from said machine removes both said canopy and said lamp and disconnects said lamp from its source of power.

CHARLES O. MARSHALL, JR.

REFERENCES CITED

The following references are of record in the file of this patent:

UNITED STATES PATENTS

| Number | Name | Date |
| --- | --- | --- |
| 1,951,826 | Foster | Mar. 20, 1934 |
| 2,294,560 | Bennett | Sept. 1, 1942 |